United States Patent Office 3,180,730
Patented Apr. 27, 1965

3,180,730
MATERIAL FOR ELECTROPHOTOGRAPHIC PURPOSES
Kurt-Walter Klupfel, Oskar Sus, Hans Behmenburg, and Wilhelm Neugebauer, all of Wiesbaden-Biebrich, Germany, assignors, by mesne assignments, to Azoplate Corporation, Murray Hill, N.J.
No Drawing. Filed Apr. 7, 1960, Ser. No. 20,516
Claims priority, application Germany, Apr. 9, 1959,
K 37,436
32 Claims. (Cl. 96—1)

Electrophotographic material normally consists of a support on which there is a photoconductive substance, this coating being electrostatically charged in the absence of light. The material is then exposed to light behind a master, or an episcopic image is projected thereon, so that an electrostatic image is formed which corresponds to the master. This image is developed by being briefly contacted with a resin powder whereupon a visible image is formed which is fixed by heating, or by the action of solvents. In this way, an image of the master which is resistant to abrasion is obtained electrophotographically.

For the photoconductive coatings, inorganic substances such as selenium, sulphur or zinc oxide have been used and also organic compounds such as anthracene and anthraquinone.

A material for electrophotographic purposes, consisting of a support and a photoconductive coating, has now been found which is characterized in that the photoconductive coating consists of or contains at least one triphenyl amine compound which may have substituents on one or more of the phenyl nuclei.

The base materials used as supports may be any that satisfy the requirements of xerography, e.g. metal or glass plates, paper or plates or foils made of electroconductive resins or plastics, such as polyvinyl alcohol, polyamides, and polyurethanes. Other plastics which have the required electroconductive properties, such as cellulose acetate and cellulose butyrate, especially in a partially saponified form, polyesters, polycarbonates, and polyolefines, if they are covered with an electroconductive layer or if they are converted into electroconductive materials e.g. by chemical treatment or by the introduction of materials which render them electroconductive, may also be used. Generally, electroconductive supports are suitable for the purposes of the present invention. In the sense of the present invention, the term "electroconductive support" comprises materials having a specific conductivity higher than $10^{-12}$ ohm$^{-1}$.cm.$^{-1}$, preferably higher than $10^{-10}$ ohm$^{-1}$.cm.$^{-1}$.

If paper is to be used as supporting material, it is preferably pretreated against the penetration of the coating solutions, e.g. it can be treated with a solution of methyl cellulose or polyvinyl alcohol in water or with a solution of an interpolymer of acrylic acid methyl ester and acrylonitrile in a mixture of acetone and methylethyl ketone, or with solutions of polyamides in aqueous alcohols, or with dispersions of such compounds.

According to the present invention triphenylamine and its substitution products are the compounds used as photoconductive coatings. Even unsubstituted triphenylamine is effective, but the sensitivity of the photoconductive coatings can be increased if the triphenylamine compounds have substituents in one or more of the phenyl nuclei; the substituents can be in the o, m, or p-position to the amine nitrogen.

A particularly good effect is obtained, however, if the substituents are in the para position to the nitrogen atom. Suitable substituents are amino groups, alkylamino groups such as dimethylamino, diethylamino and dipropylamino groups, and also amino groups that are merely alkylated such as methylamino, ethylamino and propylamino groups. Similarly, the phenyl radicals can be substituted by acylamino groups, particularly of lower fatty acids such as acetic acid, propionic acid or butyric acid, by lower alkyl groups such as methyl ethyl, propyl, butyl and amyl groups, lower alkoxy groups such as methoxy, ethoxy, propoxy or butoxy groups, or by halogens such as chlorine, bromine and iodine, or nitro or nitrile groups.

In general, it can be said that any substituents may be employed which are inert at the conditions under which electrocopying material is used, do not increase electrical conductivity to any appreciable extent, and have no active hydrogen. Acid substituents such as —SO$_3$H, —COOH or those which are affected by moisture such as —COCl, —SO$_2$Cl or —COO-alkyl are therefore excluded.

Exemplary triphenylamines are the following:

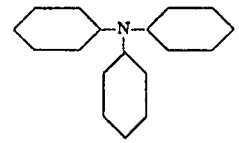

Formula 1

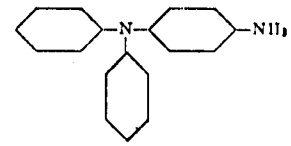

Formula 2

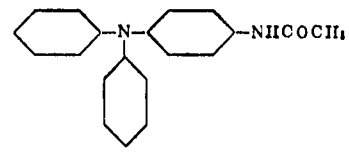

Formula 3

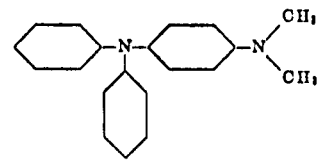

Formula 4

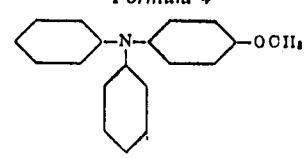

Formula 5

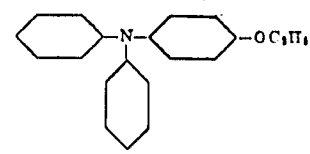

Formula 6

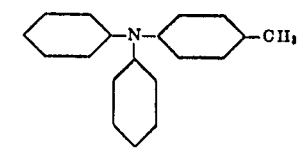

Formula 7

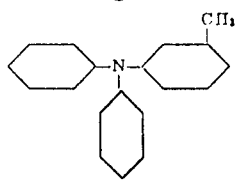

Formula 8

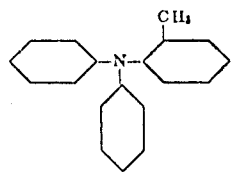

Formula 9

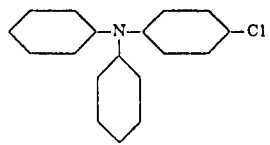

Formula 10

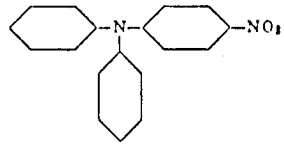

Formula 11

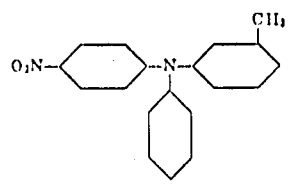

Formula 12

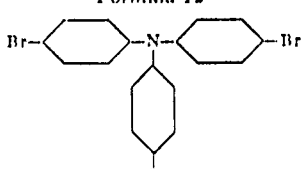

Formula 13

The preparation of the triphenylamine derivatives is by known processes, e.g. by the method given in Organic Syntheses, vol. 1, p. 544, i.e. by the reaction of the appropriate diphenylamine derivative with an iodine-substituted benzene derivative, the reaction being effected by boiling in nitrobenzene in the presence of potassium carbonate and copper powder.

In this manner, triphenylamine is obtained, and also its derivatives, of which some examples are:

4-amino-triphenylamine,
4-acetamino-triphenylamine,
4-dimethylamino-triphenylamine,
4-methoxy-triphenylamine,
4-ethoxy-triphenylamine,
4-methyl-triphenylamine,
3-methyl-triphenylamine,
2-methyl-triphenylamine,
4-chlor-triphenylamine,
4-nitro-triphenylamine,
3-methyl-4'-nitro-triphenylamine,
4,4',4''-tribromtriphenylamine.

The compounds are very well suited for the production of photoconductive coatings and are generally colorless. However, those that contain nitro groups have a yellow color.

For the preparation of the electrophotographic material, the photoconductive triphenylamines are preferably dissolved in organic solvents such as benzene, acetone, methylene chloride or ethylene glycol monomethylether, or in other organic solvents in which they are readily soluble, or in mixtures of such solvents. The supporting material is coated with the solution in the normal manner, e.g. by immersion processes, painting, roller application or by spraying. The material is then heated so that the solvent is removed. A number of the triphenylamines mentioned can be applied together to the supporting material or the compounds can be applied in association with other photoconductive substances.

Further, it is often advantageous for the triphenylamines to be used as photoconductive coatings in association with organic resins. Resins primarily of interest for this purpose include natural resins such as balsam resins, colophony and shellac, synthetic resins such as phenol resins modified with colophony, and other resins in which colophony constitutes the major part, coumarone resins, indene resins and those included under the collective term "synthetic lacquer resins." According to the Saechtling-Zebrowski Plastics Handbook "Kunststofftaschenbuch," 11th edition, 1955, page 212 et seq., these include the following: processed natural substances such as cellulose ethers; polymers such as vinyl polymers, e.g., polyvinyl chloride, polyvinylidene chloride, polyvinyl acetate, polyvinyl acetals, polyvinyl ethers, polyacrylic and polymethacrylic acid esters, as also polystyrene and isobutylene and chlorinated rubber; polycondensates, e.g., polyesters, such as phthalate resin, alkyd resin, maleic resinate, maleic acid-colophony mixed esters of higher alcohols, also phenol-formaldehyde resin, in particular colophony-modified phenol-formaldehyde condensates, urea-formaldehyde condensates, melamine-formaldehyde resins, aldehyde resins, ketone resins, particularly so-called AW 2 resins, xylene-formaldehyde resins, polyamides, polyadducts such as polyurethanes. Also, polyolefines such as various polyethylenes, polypropylenes and phtalic acid polyesters such as terephthalic and isophthalic acid ethylene glycol polyesters may be used.

If the triphenylamines are used in association with the resins described above, the proportion of resin to photoconductive substance can vary very greatly, but the content of photoconductive substance should be at least 20%. Mixtures of from 2 parts of resin and one part of photoconductive substance to one part of resin to two parts of photoconductive substance are to be preferred. Mixtures of the two substances in equal parts by weight are particularly favorable.

The solutions of the triphenylamines, with or without the resins, are applied to the supports in the usual manner, for example by painting, roller application, immersion or spraying, and then dried, an even, homogeneous, transparent and, in most cases, colorless photoconductive layer being thus formed. The light-sensitivity of these photoconductive coatings is in the long-wave ultraviolet region, at about 3600–4200 A. With mercury vapor lamps, which transmit a large amount of ultraviolet rays, short exposure times can be achieved.

The light sensitivity of the photoconductive layer in the visible part of the spectrum can be highly improved by the addition of sensitizers so that even with normal light sources short exposure times can be achieved. Even very small additions, e.g. less than 0.01 percent, have considerable effect. In general, however, the amount of "sensitizer" to be added to the photoconductive substance is from 0.01 to 5 percent and preferably 0.1 to 3 percent. The addition of larger quantities of sensitizer is possible but in general is not accompanied by any considerable increase in sensitivity.

Suitable sensitizers are constituted in particular by dyestuffs, such as those listed by way of example below. They are taken from Schultz' "Farbstofftabellen," 7th edition, 1931, 1st vol.

Triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364) and Fast Acid Eosin G (No. 870, p. 368), as also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502), and Quinizarine (No. 1148, p. 504); cyanine dyestuffs, e.g. Cyanine (No. 921, p. 394) and chlorophyll.

For the production of copies, the photoconductive coating is charged positively or negatively by means of, for example, a corona discharge with a charging apparatus maintained at 6000–7000 volts. The electrocopying material is then exposed to light in contact with a master. Alternatively, an episcopic or diascopic image is projected thereon. An electrostatic image corresponding to the master is thus produced on the material, this invisible image being developed by contact with a developer consisting of carrier and toner. The carriers used may be, for example, tiny glass balls, iron powder or tiny plastic balls. The toner consists of a resin-carbon black mixture or a pigmented resin. The toner is generally used in a grain size of 1 to 100μ, preferably 5 to 30μ. The developer may also consist of a resin or pigment suspended in a non-conductive liquid, in which resins may be dissolved. The image that now becomes visible is then fixed, e.g., by heating with an infra-red radiator to 100–170° C., preferably 120–150° C., or by treatment with solvents such as trichloroethylene, carbon tetrachloride or ethyl alcohol, or steam. If a polarity of the electrical charge is used which is opposite to that of the toner contained in the developer, images corresponding to the master characterized by good contrast effect are obtained. By changing the polarity of the corona discharge it is thus possible to obtain reversal images with the same master and the same toner.

The electrophotographic images thus obtained can be converted into printing plates, if the support, e.g., paper, metal or plastic foil, is wiped over with a solvent for the photoconductive layer, e.g. alcohol or acetic acid, then rinsed with water and inked up in known manner with greasy ink. In this manner, printing plates are obtained which can be set up in an offset machine and used for printing.

If transparent supporting material is used, the electrophotographic images can also be used as masters for the production of additional copies on any type of light-sensitive sheets. In this respect, the photoconductive compounds to be used as provided by the invention are superior to the substances used hitherto, such as selenium or zinc oxide, inasmuch as the latter give only cloudy layers.

The photoconductive layers of the present invention can be charged positively as well as negatively. This has the advantage that with the same developer, merely by changing the polarity of the corona discharge, it is possible to obtain direct and reversal images from the same master. The photoconductivity of the photoconductors according to the present invention is superior to that of known organic photoconductive substances, such as anthracene, benzidine, and anthraquinone.

If translucent supports are used for photoconductive layers such as are provided by the invention, images can be produced by the reflex method also. The electrophotographic material of the invention has the advantage that it gives images rich in contrast and that it can be charged positively as well as negatively.

The preparation of the photoconductive substances is illustrated below by some examples:

4 - dimethylamino - triphenylamine, corresponding to Formula 4, with a melting point of 125° C., is obtained if a solution of 5.2 parts by weight of 4-aminotriphenylamine, corresponding to Formula 2, and 4 parts by volume of dimethylsulphate in 30 parts by volume of ethyl alcohol is first shaken, then boiled, and then treated with 20 percent sodium hydroxide solution. The crude product, which separates out during cooling, is recrystallized from benzene.

4-ethoxy-triphenylamine, corresponding to Formula 6, with a melting point of 91° C., is obtained if a mixture of 17.6 parts by weight of diphenylamine, 24.8 parts by weight of p-iodophenetole, 13.8 parts by weight of anhydrous potassium carbonate and 0.5 part by weight of copper powder is heated for 12 hours in 100 parts of volume of nitrobenzene. The water formed during the reaction is removed from the reaction products as it is produced. The nitrobenzene is then driven off by steam distillation and the residue is extracted with ether and shaken with dilute hydrochloric acid and water. The ether extract is dried over calcium chloride. The ether is distilled off and the residue is purified by recrystallization from alcohol in the presence of animal charcoal.

2-methyl-triphenylamine, corresponding to Formula 9, with a melting point of 60° C., is obtained if a mixture of 13.6 parts by weight of diphenylamine, 17 parts by weight of o-iodo-toluene, 10.7 parts by weight of anhydrous potassium carbonate and 0.3 part by weight of copper powder is heated for 12 hours in 80 parts by volume of nitrobenzene. Further procedure is as described above under Formula 6. The crude product is twice recrystallized from alcohol in the presence of animal charcoal.

3-methyl-4'-nitro-triphenylamine, corresponding to Formula 12, with a melting point of 100° C., is obtained if a mixture of 23.5 parts by weight of 4-nitrotriphenylamine, 22 parts by weight of m-iodo-toluene, 13.8 parts by weight of anhydrous potassium carbonate and 0.5 part by weight of copper powder is boiled for 12 hours in 100 parts by volume of nitrobenzene. Further procedure is as described above under Formula 6. The crude product is twice purified from alcohol in the presence of animal charcoal. The invention will be further illustrated by reference to the following specific examples:

*Example 1*

1 part by weight of triphenylamine, corresponding to Formula 1, and 1 part by weight of ketone resin (Kunstharz EM) are dissolved in 30 parts by volume of glycol monomethylether. The solution is applied to a paper foil which in known manner has been made, by means of a precoat, resistant to the penetration of organic solvents. After evaporation of the solvent, the coating adheres firmly to the surface of the paper.

On this paper, direct images are produced by the electrophotographic process in the following manner: the paper is given a negative electrostatic charge by corona discharge and is exposed under a master to the light of a high pressure mercury vapor lamp. It is then powdered over with a developer consisting of a mixture of carrier and toner. The carrier used may consist of, e.g., tiny glass balls or iron powder. The toner consists of a resin-carbon black mixture or of a pigmented resin of a grain size of 1 to 100 μ, preferably 5–30 μ. The finely divided resin-carbon black mixture (toner) which due to triboelectric effects acquires a positive charge adheres to the parts of the coating not struck by light during the exposure and an image corresponding to the master becomes visible. It is heated and thereby made permanent (fixed).

By changing the polarity of the corona discharge, it is also possible to obtain reversal images, using the same toner and the same master.

If a suitable transparent plastic foil or transparent paper ("Hartpost") is used as a support for the photoelectric coating instead of the paper used in the case described above, the images produced are suitable as reproduction masters for any sort of duplication by means of light-sensitive sheets.

Example 2

1 part by weight of 3-methyl-4'-nitrotriphenylamine, corresponding to Formula 12, and 1 part by weight of ketone resin (Kunstharz SK) are dissolved in 30 parts by volume of glycol monomethylether and coated upon a superficially roughened aluminum foil. After evaporation of the solvent, the coating remaining adheres firmly to the surface of the foil. For the preparation of an image, the further procedure is as described in Example 1. An image corresponding to the master is obtained which is fixed, similarly as described in Example 1. This image can be converted into a printing plate if the aluminum foil is wiped over on the image side with a developer consisting of glycol monomethylether and 1.5 percent phosphoric acid in the proportions of 4:1; rinsed down with water and inked up with greasy ink and 0.5 percent phosphoric acid.

Example 3

1 part by weight of 4-amino-triphenylamine, corresponding to Formula 2, and 2 parts by weight of coumarone resin (Cumaronharz 701/70) are dissolved in 30 parts by volume of benzene. The solution is applied to a cellulose acetate foil and dried. Images can be produced by the electrophotographic process on this foil if the foil, after being charged by means of a corona discharge, is exposed to light under a master and then in known manner dusted over with a developer as described in Example 1. After being heated (fixed), these images can be used as photoprinting masters.

Example 4

1 part by weight of triphenylamine, corresponding to Formula 1, and 1 part by weight of ketone resin (Kunstharz EM) are dissolved in 30 parts by volume of glycol monomethylether; 0.01 part by weight of Rhodamine B (Schultz' "Farbstofftabellen," 7th edition, 1st vol., No. 864) is added to the solution, which is then coated upon a paper foil that has been made, by means of a precoat, impermeable to organic solvents. After the evaporation of the solvent, the coating adheres firmly to the surface of the paper foil. In a manner known per se, the coated paper foil is provided with a positive electrostatic charge and, thus sensitized, is exposed under a master, e.g., for 1 second to the light of a 100 watt incandescent lamp at a distance of 15 cm., and then the exposed surface is dusted over with a developer consisting of a mixture of carrier and toner. The carrier used consists of, e.g., tiny glass balls, coated with a resin, e.g. coumarone resin. The toner consists of a carbon black-resin mixture or a pigmented resin of a grain size of 1 to 100μ, preferably 5–30μ. An image corresponding to the master is formed which is fixed by treatment with trichloroethylene vapors.

Example 5

0.7 part by weight of triphenylamine, corresponding to Formula 1, 0.7 part by weight of 4-aminotriphenylamine, corresponding to Formula 3, and 0.7 part by weight of 4-dimethylamino-triphenylamine, corresponding to Formula 4, are dissolved in 30 parts by volume of toluene. About 15 parts by volume of this solution are coated upon a paper foil of size DIN A 4 the surface of which has been treated against the penetration of organic solvents and the coating is dried. With the coated paper foil, electrophotographic images are produced as described in Example 1. If, after the image has been powdered over with the developer described in Example 1 but not yet fixed, a sheet of paper is placed thereon and the back of the transfer material is charged by means of a corona discharge, the charge having the same polarity as that originally applied to the electroconductive material before exposure, the carbon black-resin powder image will be transferred from the electrophotographic coating to the paper in the form of a mirror image. If the carbon black-resin image is transferred to transparent paper or to a transparent plastic foil, the image obtained can be further reproduced, e.g., on diazo paper.

Example 6

1 part by weight of 4-acetamino-triphenylamine, corresponding to Formula 3, 1 part by weight of a polymerized natural resin ("Poly Pale") and 0.01 part by weight of Acid Violet 6 BN (Schultz' "Farbstofftabellen," 7th edition, 1st vol., 1931, No. 831) are dissolved in 30 parts by volume of glycol monomethylether. The light blue solution is applied to paper and dried. After being charged by means of a corona discharge, the sensitized paper is exposed under a transparent master to a 100 watt incandescent lamp and dusted over with a developer consisting of a mixture of carrier and toner. The carrier used can be, e.g., tiny glass balls, iron powder or organic and inorganic substances. The toner consists of a resin-carbon black mixture or a pigmented resin of a grain size of 1 to 100μ, preferably 5–30μ. An image corresponding to the master is formed which is fixed by heating. Images rich in contrast and free of background are produced on light blue ground.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a dyestuff sensitizer and a compound selected from the group consisting of triphenylamine and a substituted triphenylamine the substituents of which are inert at the conditions under which the material is used, do not increase electrical conductivity to a substantial extent, and contain no active hydrogen.

2. An electrophotographic material comprising a conductive support layer and a photoconductive insulating layer, the latter comprising a dyestuff sensitizer and a compound selected from the group consisting of triphenylamine and triphenylamine substituted by amino, alkylamino, acylamino, lower alkyl, lower alkoxy, halogen, nitro, and nitrile radicals.

3. An electrophotographic material comprising a conductive support layer and a photoconductive insulating layer, the latter comprising triphenylamine and a dyestuff sensitizer.

4. An electrophotographic material comprising a conductive support layer and a photoconductive insulating layer, the latter comprising a dyestuff sensitizer and a compound having the formula

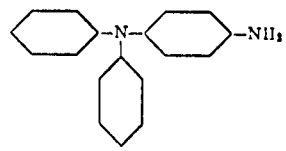

5. An electrophotographic material comprising a conductive support layer and a photoconductive insulating layer, the latter comprising a dyestuff sensitizer and a compound having the formula

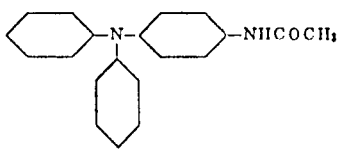

6. An electrophotographic material comprising a conductive support layer and a photoconductive insulating layer, the latter comprising a dyestuff sensitizer and a compound having the formula

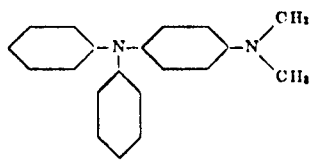

7. An electrophotographic material comprising a conductive support layer and a photoconductive insulating layer, the latter comprising a dyestuff sensitizer and a compound having the formula

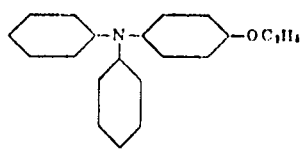

8. An electrophotographic material comprising a conductive support layer and a photoconductive insulating layer, the latter comprising a dyestuff sensitizer and a compound having the formula

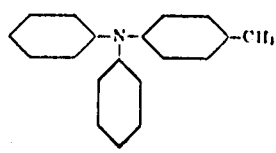

9. An electrophotographic material comprising a conductive support layer and a photoconductive insulating layer, the latter comprising a dyestuff sensitizer and a compound having the formula

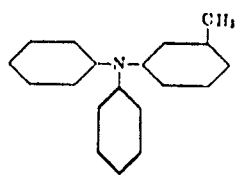

10. An electrophotographic material comprising a conductive support layer and a photoconductive insulating layer, the latter comprising a dyestuff sensitizer and a compound having the formula 11. An electrophotographic material comprising a conductive support layer and a photoconductive insulating layer, the latter comprising a dyestuff sensitizer and a compound having the formula

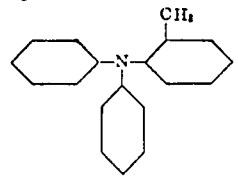

12. An electrophotographic material comprising a conductive support layer and a photoconductive insulating layer, the latter comprising a dyestuff sensitizer and a compound having the formula

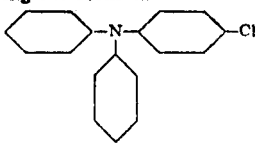

13. An electrophotographic material comprising a conductive support layer and a photoconductive insulating layer, the latter comprising a dyestuff sensitizer and a compound having the formula

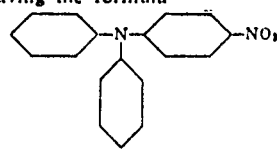

14. An electrophotographic material comprising a conductive support layer and a photoconductive insulating layer, the latter comprising a dyestuff sensitizer and a compound having the formula

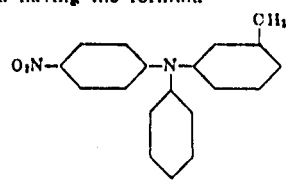

15. An electrophotographic material comprising a conductive support layer and a photoconductive insulating layer, the latter comprising a dyestuff sensitizer and a compound having the formula

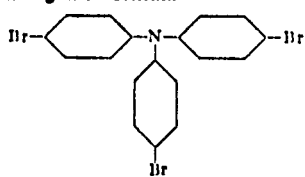

16. A photographic reproduction process which comprises electrostatically charging a supported photoconductive insulating layer, exposing the charged material to a light image and developing the resulting image with an electroscopic material, the photoconductive layer comprising a compound selected from the group consisting of triphenylamine and a substituted triphenylamine the substituents of which are inert at the conditions under which the material is used, do not increase electrical conductivity to a substantial extent, and contain no active hydrogen.

17. A photographic reproduction process which comprises electrostatically charging a supported photoconductive insulating layer, exposing the charged material to a light image and developing the resulting image with an electroscopic material, the photoconductive layer comprising a compound selected from the group consisting of triphenylamine and triphenylamine substituted by amino, alkylamino, acylamino, lower alkyl, lower alkoxy, halogen, nitro, and nitrile radicals.

18. A process according to claim 16 in which the photoconductive layer contains a resin.

19. A process according to claim 16 in which the photoconductive layer contains a sensitizer.

20. A photographic reproduction process which comprises electrostatically charging a supported photoconductive insulating layer, exposing the charged material to a light image and developing the resulting image with an electroscopic material, the photoconductive layer comprising triphenylamine.

21. A photographic reproduction process which comprises electrostatically charging a supported photoconductive insulating layer, exposing the charged material to a light image and developing the resulting image with an electroscopic material, the photoconductive layer comprising a compound having the formula

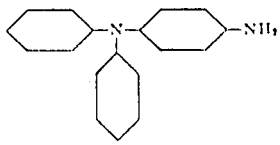

22. A photographic reproduction process which comprises electrostatically charging a supported photoconductive insulating layer, exposing the charged material to a light image and developing the resulting image with an electroscopic material, the photoconductive layer comprising a compound having the formula

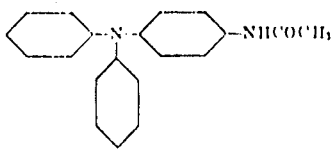

23. A photographic reproduction process which comprises electrostatically charging a supported photoconductive insulating layer, exposing the charged material to a light image and developing the resulting image with an electroscopic material, the photoconductive layer comprising a compound having the formula

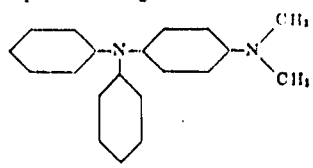

24. A photographic reproduction process which comprises electrostatically charging a supported photoconductive insulating layer, exposing the charged material to a light image and developing the resulting image with an electroscopic material, the photoconductive layer comprising a compound having the formula

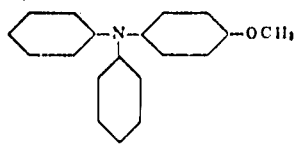

25. A photographic reproduction process which comprises electrostatically charging a supported photoconductive insulating layer, exposing the charged material to a light image and developing the resulting image with an electroscopic material, the photoconductive layer comprising a compound having the formula

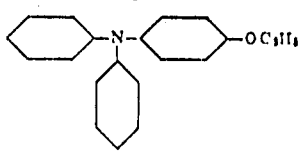

26. A photographic reproduction process which comprises electrostatically charging a supported photoconductive insulating layer, exposing the charged material to a light image and developing the resulting image with an electroscopic material, the photoconductive layer comprising a compound having the formula

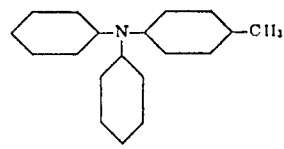

27. A photographic reproduction process which comprises electrostatically charging a supported photoconductive insulating layer, exposing the charged material to a light image and developing the resulting image with an electroscopic material, the photoconductive layer comprising a compound having the formula

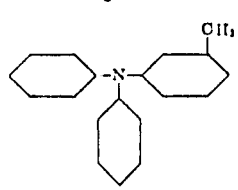

28. A photographic reproduction process which comprises electrostatically charging a supported photoconductive insulating layer, exposing the charged material to a light image and developing the resulting image with an electroscopic material, the photoconductive layer comprising a compound having the formula

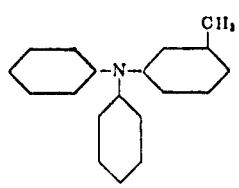

29. A photographic reproduction process which comprises electrostatically charging a supported photoconductive insulating layer, exposing the charged material to a light image and developing the resulting image with an electroscopic material, the photoconductive layer comprising a compound having the formula

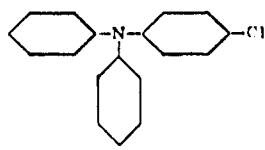

30. A photographic reproduction process which comprises electrostatically charging a supported photoconductive insulating layer, exposing the charged material to a light image and developing the resulting image with an electroscopic material, the photoconductive layer comprising a compound having the formula

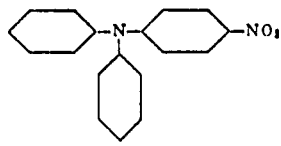

31. A photographic reproduction process which comprises electrostatically charging a supported photoconductive insulating layer, exposing the charged material to a light image and developing the resulting image with an electroscopic material, the photoconductive layer comprising a compound having the formula

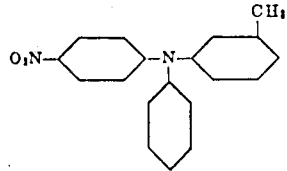

32. A photographic reproduction process which comprises electrostatically charging a supported photoconductive insulating layer, exposing the charged material to a light image and developing the resulting image with an electroscopic material, the photoconductive layer comprising a compound having the formula

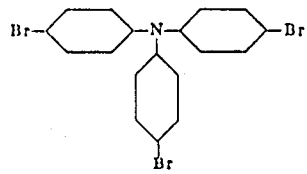

References Cited by the Examiner

UNITED STATES PATENTS

| | | | |
|---|---|---|---|
| 2,297,691 | 10/42 | Carlson | 96—1 |
| 2,766,233 | 10/56 | Kartinos et al. | 252—301.2 |
| 3,042,515 | 7/62 | Wainer | 96—90 |

FOREIGN PATENTS

| | | |
|---|---|---|
| 562,336 | 5/58 | Belgium. |
| 1,177,936 | 12/58 | France. |
| 1,188,600 | 3/59 | France. |
| 201,301 | 3/56 | Australia. |

OTHER REFERENCES

JACS 66, December 1944, pp. 2100–2116.
Das Papier, April 1954, pp. 109–120.
Vartanian: Acta Physicochimica URSS, vol. 22, #2, pp. 201–24, 1947.
Winslow et al.: JACS 77, Sept. 20, 1955, pp. 4751–6.
Lyons et al.: J. Chem. Soc., 1957, pp. 3648–68.

NORMAN G. TORCHIN, *Primary Examiner.*

PHILIP E. MANGAN, *Examiner.*